US011624926B1

United States Patent
Lam et al.

(10) Patent No.: US 11,624,926 B1
(45) Date of Patent: Apr. 11, 2023

(54) DISPLAY SYSTEMS WITH COLLECTION OPTICS FOR DISPARITY SENSING DETECTORS

(71) Applicant: Meta Platforms Technologies, LLC, Menlo Park, CA (US)

(72) Inventors: Wai Sze Tiffany Lam, Lynnwood, WA (US); Yang Yang, Redmond, WA (US); Dominic Meiser, Bothell, WA (US); Wanli Chi, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/569,381

(22) Filed: Jan. 5, 2022

(51) Int. Cl.
    *G02B 27/01* (2006.01)
    *G02B 27/00* (2006.01)

(52) U.S. Cl.
    CPC ..... *G02B 27/0172* (2013.01); *G02B 27/0093* (2013.01); *G02B 27/0101* (2013.01); *G02B 2027/014* (2013.01); *G02B 2027/0178* (2013.01)

(58) Field of Classification Search
    CPC ............ G02B 27/0172; G02B 27/0093; G02B 27/0101; G02B 2027/014; G02B 2027/0178
    See application file for complete search history.

(56) References Cited

U.S. PATENT DOCUMENTS

| 2014/0375681 A1* | 12/2014 | Robbins | G02B 27/017 345/633 |
| 2017/0299865 A1* | 10/2017 | Vallius | G02B 27/0081 |
| 2020/0018968 A1* | 1/2020 | Edwin | G02B 27/0081 |

* cited by examiner

*Primary Examiner* — Amit Chatly
(74) *Attorney, Agent, or Firm* — Mannava & Kang, P.C.

(57) ABSTRACT

According to examples, a display system may include a disparity sensing detector, collection optics, and a first lens assembly. The first lens assembly may include a first projector to output a first display light associated with a first image and a first waveguide for propagating the first display light to the collection optics, in which the collection optics is to direct the first display light to the disparity sensing detector. The display system may also include a second lens assembly including a second projector to output a second display light associated with a second image and a second waveguide for propagating the second display light to the collection optics, in which the collection optics is to direct the second display light to the disparity sensing detector.

20 Claims, 12 Drawing Sheets

800

DISPLAY SYSTEMS WITH COLLECTION OPTICS FOR DISPARITY SENSING DETECTORS

TECHNICAL FIELD

This patent application relates generally to display systems, and more specifically, to display systems that include collection optics to direct light to a disparity sensing detector. The collection optics have a relatively small footprint to enable the display systems to enable disparity sensing to be performed without significantly increasing the sizes of the display systems.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

To facilitate delivery of this and other related content, service providers have endeavored to provide various forms of wearable display systems. One such example may be a head-mounted device (HMD), such as a wearable headset, wearable eyewear, or eyeglasses. In some examples, the head-mounted device (HMD) may employ a first projector and a second projector to direct light associated with a first image and a second image, respectively, through one or more intermediary optical components at each respective lens, to generate "binocular" vision for viewing by a user.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
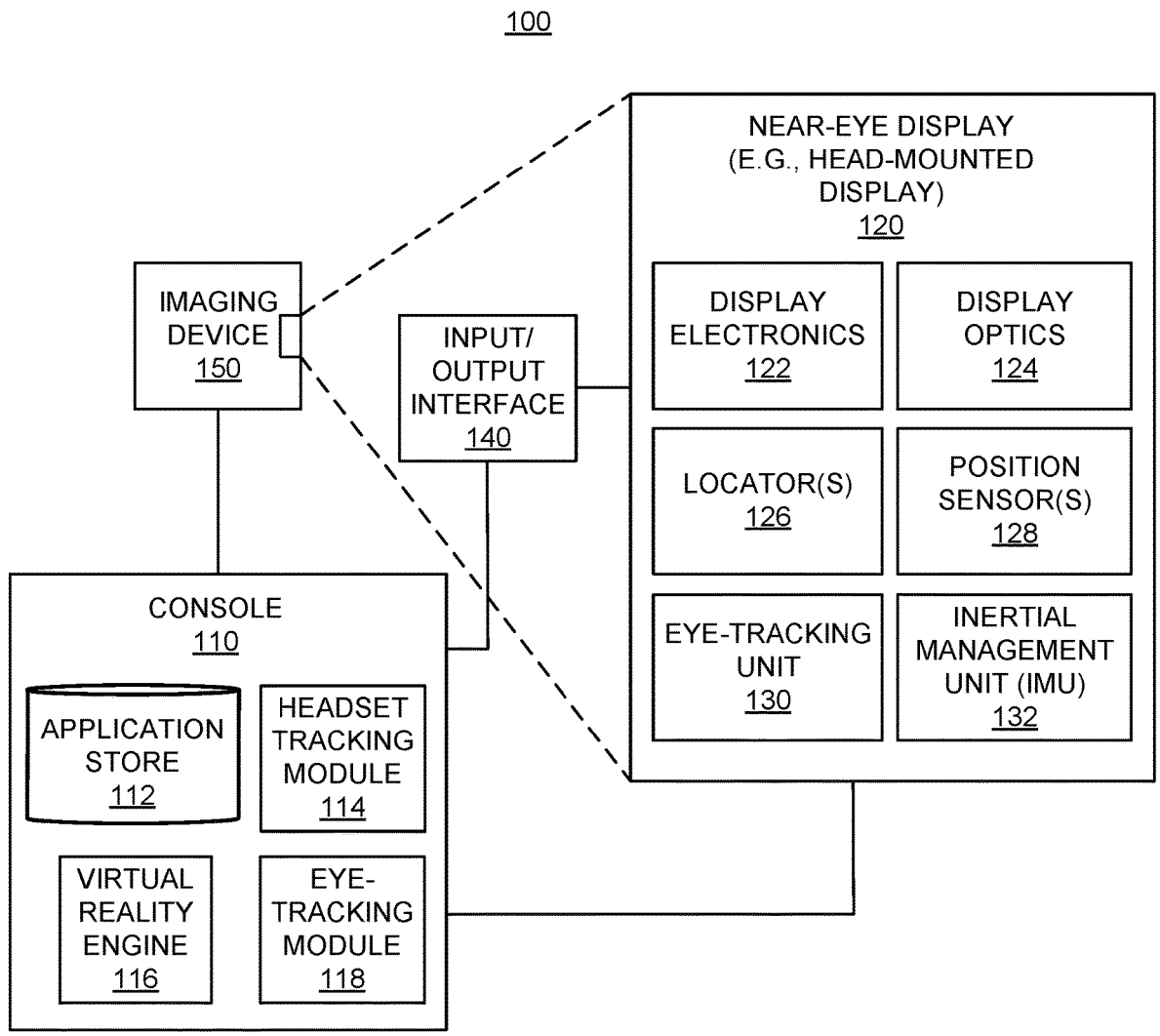
FIG. 1 illustrates a block diagram of an artificial reality system environment including a near-eye display, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Some display systems, such as, AR-based head-mounted devices and/or eyewear devices, employ waveguides having multiplexed gratings to propagate light associated with images from projectors to eyeboxes. That is, the display systems may have a first lens assembly that propagates a first display light from a first projector to a first eyebox. The display systems may also have a second lens assembly that propagates a second display light from a second projector to a second eyebox. The first eyebox may display first images to be viewed by a user's first eye, e.g., left or right eye, and the second eyebox may display second images to be viewed by the user's second eye, e.g., the other of the left or right eye.

In many instances, the display of the first images and the second images are intended to be synchronized with each other. For example, the first images and the second images are to be displayed such that the first and second images closely overlap each other. In some instances, however, there may be a shift in the positions at which either or both the first image and the second image are displayed. This may occur due to misalignment between a projector and a waveguide, errors within manufacturing tolerance limits, and/or the like. When such a shift occurs, a user of the display system may experience poor visual acuity and significant visual discomfort, which may result in dizziness, eye fatigue, or other side effects.

In some instances, a dedicated source of display information and sensor may be employed to determine whether the first images and the second images are misaligned with respect to each other. The dedicated source of display information may be separate from the first projector and the second projector that respectively output the first images and the second images. The dedicated source of display information may thus be an extra component on the display systems. As a result, the use of the dedicated source of display information may require additional manufacturing steps in the fabrication of the display systems. The dedicated source of display information may also cause the display systems to have relatively larger sizes and may make use of the dedicated source of display information in rear-mounted display systems difficult or impossible. A "rear-mounted" display system may be defined as a display system in which the first and second projectors are rear-mounted (i.e., closer the user's eyes and away from displayed images).

Disclosed herein are display systems, apparatuses, and wearable eyewear that may include a disparity sensing detector to detect locations at which a first image and a second image are displayed, for instance, in respective eyeboxes of display systems. Also disclosed herein are collection optics that may direct light received from first and second waveguides to the disparity sensing detector. For instance, a first projector may output a first display light to a first waveguide and a second projector may output a second display light to a second waveguide. The first waveguide may propagate the first display light to the collection optics and the second waveguide may propagate the second display light to the collection optics. The collection optics may collect and focus the first display light and the second display light to the disparity sensing detector.

The first display light may include a first test image and the second display light may include a second test image. The first test image and the second test image may each be, for instance, a relatively small dot or other simple image. The disparity sensing detector may detect the locations on the sensor at which the first test image and the second test image are detected. A controller may compare the detected locations to determine whether a disparity exists between the locations at which the first display light and the second display light are displayed. In some examples, the controller may determine a direction and/or magnitude of the disparity and may compensate for the disparity. In some examples, the controller may compensate for the disparity by causing the first projector to shift the first display light by one or more pixels and/or causing the second projector to shift the second display light by one or more pixels. The controller may cause the first display light and/or the second display light to be shifted in a manner that causes the disparity to be reduced or removed.

As disclosed herein, the collection optics may include a light directing device for receiving the first display light and the second display light from the respective waveguides and directing the received display light to the disparity sensing detector. The light directing device may include any of a number of various types of light directing devices as disclosed herein. For instance, the light directing device may include a prism, a thin waveguide, reflectors, combinations thereof, and/or the like. The collection optics may also include a lens (or multiple lenses) that may focus or otherwise direct the light from the light directing device to the disparity sensing detector.

Through implementation of features of the present disclosure, a need for a dedicated source of display information to determine whether there is a disparity between multiple images that may require additional fabrication (i.e., manufacturing steps) may be obviated. Moreover, the features disclosed herein may enable for disparity analysis and correction while reducing or eliminating interference(s) between display and disparity sensing paths. As disclosed herein, the collection optics may be integrated into the lens assembly and/or the frame of a display system and may thus have a relatively small form factor. As a result, the collection optics disclosed herein may enable determinations of dispersion among images in rear-mounted display systems without the use of an extra dedicated source of display information.

The display systems (e.g., AR-based head-mounted device (HMD) or eyewear) described herein may have lens assemblies that respectively include the first waveguide and the second waveguide. In addition, the first display light and the second display light may each be associated with an image that may be viewable by a user of the display system when the image is displayed on the eyeboxes of the display system. The first and second waveguides may each include a plurality of gratings through which the display light may sequentially be propagated.

The plurality of gratings described herein may be associated with a volume Bragg grating (VBG)-based waveguide display device. As used herein, a volume Bragg grating (VBG) may refer to a substantially and/or completely transparent optical device or component that may exhibit a periodic variation of refractive index (e.g., using a volume Bragg grating (VBG)). As discussed further in the examples below, one or more volume Bragg gratings (VBGs) may be provided with or integrated within a waveguide component of a display system. As used herein, a waveguide may be any optical structure that propagates a variety of signals (e.g., optical signals, electromagnetic waves, sound waves, etc.) in one or more directions. Employing principles of physics, information contained in such signals, may be directed using any number of waveguides or similar components.

As used herein, "unused" light may include any light that may be propagated to and/or within a waveguide configuration but not be propagated from or out of a waveguide configuration for viewing purposes by a user or wearer of the head-mounted device (HMD). Also, as used herein, "disparity" may refer to any issue (e.g., a sub-optimal or sub-standard aspect) associated with projection of an image for viewing by a user. In most cases, such disparities may refer to issues associated with a first image and a second image provided by a display device for viewing by a user where the user's perception of the first and second images appear to be unmerged, displaced, shifted, rotated, or distorted by itself or relative to one another, or exhibit other characteristics that require correction for proper viewing by a user. Moreover, "disparity sensing" may refer to detecting any existence of, or events or changes, associated with such disparities in a display device.

FIG. 1 illustrates a block diagram of an artificial reality system environment 100 including a near-eye display, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements, and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an optional input/output interface 140, each of which may be coupled to a console 110. The console 110 may be optional in some instances as the functions of the console 110 may be integrated into the near-eye display 120. In some examples, the near-eye display 120 may be a head-mounted display (HMD) that presents content to a user.

In some instances, for a near-eye display system, it may generally be desirable to expand an eyebox, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular HMD) or both eyes (for binocular HMDs). Also, as used herein, an "eyebox"

may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eyebox.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including a HMD, a pair of glasses, or other similar wearable eyewear or device. Examples of the near-eye display 120 are further described below with respect to FIGS. 2 and 3. Additionally, in some examples, the functionality described herein may be used in a HMD or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlayed digital content (e.g., images, video, sound, etc.) to present an augmented reality to a user.

In some examples, the near-eye display 120 may include any number of display electronics 122, display optics 124, and an eye-tracking unit 130. In some examples, the near eye display 120 may also include one or more locators 126, one or more position sensors 128, and an inertial measurement unit (IMU) 132. In some examples, the near-eye display 120 may omit any of the eye-tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (IMU) 132, internal to the inertial measurement unit (IMU) 132, or any combination thereof. Based on the one or more measurement signals from the one or more position sensors 128, the inertial measurement unit (IMU) 132 may generate fast calibration data indicating an estimated position of the near-eye display 120 that may be relative to an initial position of the near-eye display 120. For example, the inertial measurement unit (IMU) 132 may integrate measurement signals received from accelerometers over time to estimate a velocity vector and integrate the velocity vector over time to determine an estimated position of a reference point on the near-eye display 120. Alternatively, the inertial measurement unit (IMU) 132 may provide the sampled measurement signals to the optional console 110, which may determine the fast calibration data.

The eye-tracking unit 130 may include one or more eye-tracking systems. As used herein, "eye tracking" may refer to determining an eye's position or relative position, including orientation, location, and/or gaze of a user's eye. In some examples, an eye-tracking system may include an imaging system that captures one or more images of an eye and may optionally include a light emitter, which may generate light that is directed to an eye such that light reflected by the eye may be captured by the imaging system. In other examples, the eye-tracking unit 130 may capture reflected radio waves emitted by a miniature radar unit. These data associated with the eye may be used to determine or predict eye position, orientation, movement, location, and/or gaze.

In some examples, the near-eye display 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye-tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display 120 for presentation to the user in accordance with information received from one or more of external imaging device 150, the near-eye display 120, and the input/output interface 140. For example, in the example shown in FIG. 1, the optional console 110 may include an application store 112, a headset tracking module 114, a virtual reality engine 116, and an eye-tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optical console 110 may or may not be needed or the optional console 110 may be integrated with or separate from the near-eye display 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120. Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye-tracking module 118. Based on the received information, the virtual reality engine 116 may determine content to provide to the near-eye display 120 for presentation to the user.

In some examples, the eye-tracking module 118 may receive eye-tracking data from the eye-tracking unit 130 and determine the position of the user's eye based on the eye tracking data. In some examples, the position of the eye may include an eye's orientation, location, or both relative to the near-eye display 120 or any element thereof. So, in these examples, because the eye's axes of rotation change as a function of the eye's location in its socket, determining the eye's location in its socket may allow the eye-tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

Figure 2:
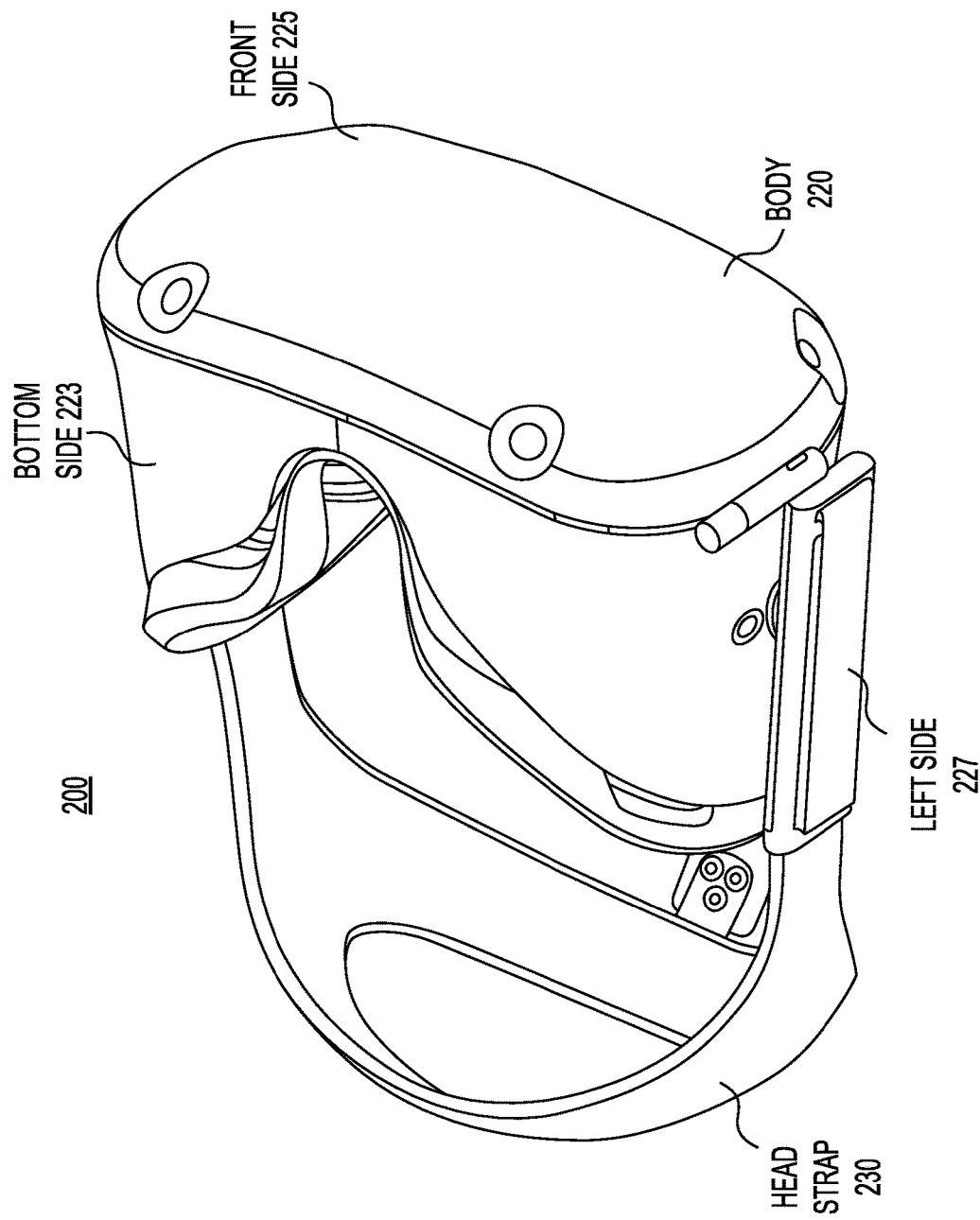
FIG. 2 illustrates a perspective view of a near-eye display in the form of a head-mounted display (HMD) device, according to an example.

FIG. 2 illustrates a perspective view of a near-eye display in the form of a head-mounted display (HMD) device 200, according to an example. In some examples, the HMD device 200 may be a part of a virtual reality (VR) system, an augmented reality (AR) system, a mixed reality (MR) system, another system that uses displays or wearables, or any combination thereof. In some examples, the HMD device 200 may include a body 220 and a head strap 230. FIG. 2 shows a bottom side 223, a front side 225, and a left side 227 of the body 220 in the perspective view. In some examples, the head strap 230 may have an adjustable or extendible length. In particular, in some examples, there may be a sufficient space between the body 220 and the head strap 230 of the HMD device 200 for allowing a user to mount the HMD device 200 onto the user's head. In some examples, the HMD device 200 may include additional, fewer, and/or different components.

In some examples, the HMD device 200 may present to a user, media or other digital content including virtual and/or augmented views of a physical, real-world environment with computer-generated elements. Examples of the media or digital content presented by the HMD device 200 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies (not shown in FIG. 2) enclosed in the body 220 of the HMD device 200.

In some examples, the HMD device 200 may include various sensors (not shown), such as depth sensors, motion sensors, position sensors, and/or eye tracking sensors. Some of these sensors may use any number of structured or unstructured light patterns for sensing purposes. In some examples, the HMD device 200 may include an input/output interface 140 for communicating with a console 110, as described with respect to FIG. 1. In some examples, the HMD device 200 may include a virtual reality engine (not shown), but similar to the virtual reality engine 116 described with respect to FIG. 1, that may execute applications within the HMD device 200 and receive depth information, position information, acceleration information, velocity information, predicted future positions, or any combination thereof of the HMD device 200 from the various sensors.

In some examples, the information received by the virtual reality engine 116 may be used for producing a signal (e.g., display instructions) to the one or more display assemblies. In some examples, the HMD device 200 may include locators (not shown), but similar to the virtual locators 126 described in FIG. 1, which may be located in fixed positions on the body 220 of the HMD device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (i.e., "eye-side"). In some examples, and as discussed herein, a projector for a display system shaped liked eyeglasses may be mounted or positioned in a temple arm (i.e., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

Figure 3:
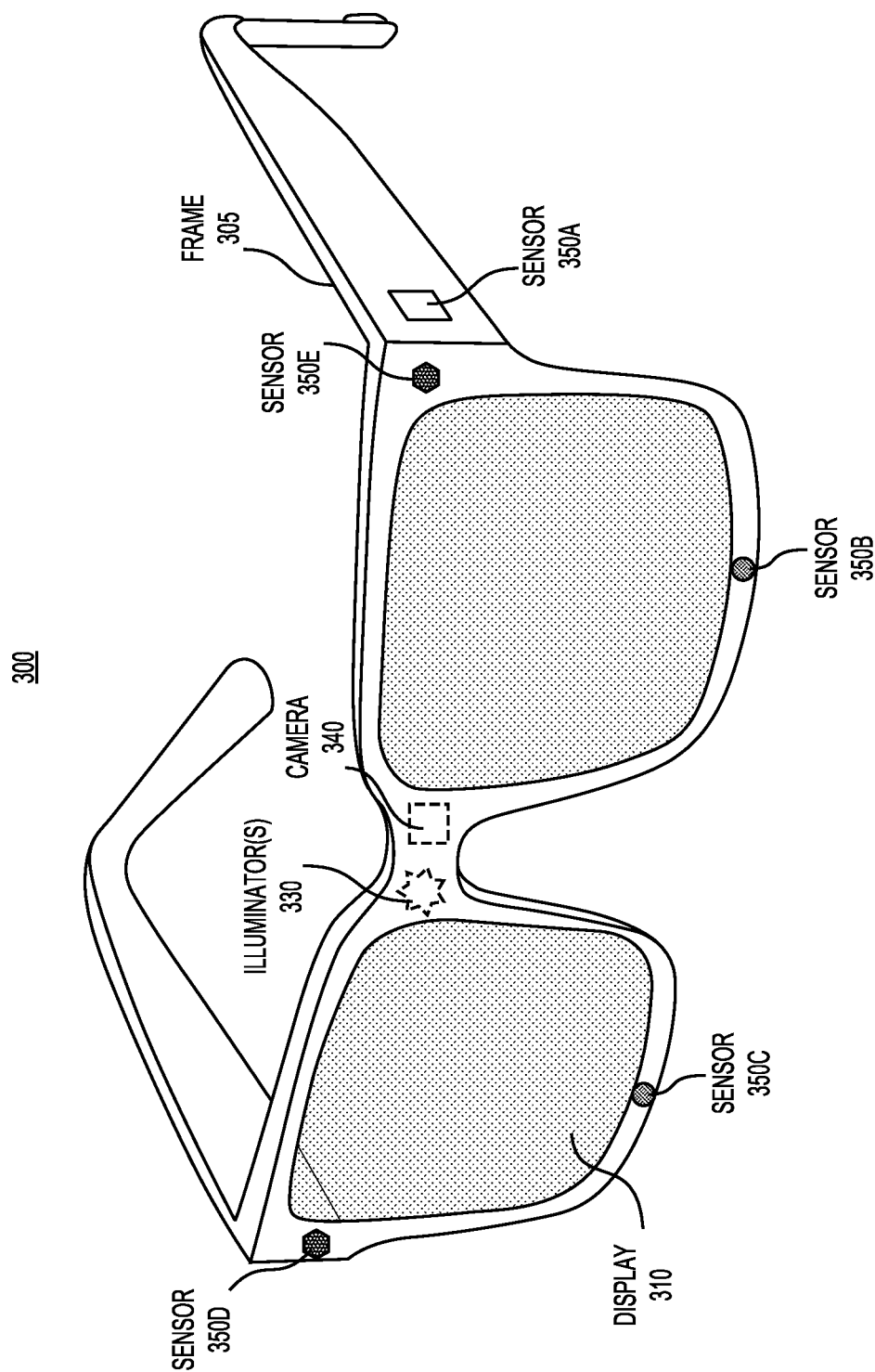
FIG. 3 is a perspective view of a near-eye display in the form of a pair of glasses, according to an example.

FIG. 3 is a perspective view of a near-eye display 300 in the form of a pair of glasses (or other similar eyewear), according to an example. In some examples, the near-eye display 300 may be a specific implementation of near-eye display 120 of FIG. 1, and may be configured to operate as a virtual reality display, an augmented reality display, and/or a mixed reality display.

In some examples, the near-eye display 300 may include a frame 305 and a display 310. In some examples, the display 310 may be configured to present media or other content to a user. In some examples, the display 310 may include display electronics and/or display optics, similar to components described with respect to FIGS. 1-2. For example, as described above with respect to the near-eye display 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc.

In some examples, the near-eye display 300 may further include various sensors 350a, 350b, 350c, 350d, and 350e on or within a frame 305. In some examples, the various sensors 350a-350e may include any number of depth sensors, motion sensors, position sensors, inertial sensors, and/or ambient light sensors, as shown. In some examples, the various sensors 350a-350e may include any number of image sensors configured to generate image data representing different fields of views in one or more different directions. In some examples, the various sensors 350a-350e may be used as input devices to control or influence the displayed content of the near-eye display 300, and/or to provide an interactive virtual reality (VR), augmented reality (AR), and/or mixed reality (MR) experience to a user of the near-eye display 300. In some examples, the various sensors 350a-350e may also be used for stereoscopic imaging or other similar application.

In some examples, the near-eye display 300 may further include one or more illuminators 330 to project light into a physical environment. The projected light may be associated with different frequency bands (e.g., visible light, infra-red light, ultra-violet light, etc.), and may serve various purposes. In some examples, the one or more illuminator(s) 330 may be used as locators, such as the one or more locators 126 described above with respect to FIGS. 1-2.

In some examples, the near-eye display 300 may also include a camera 340 or other image capture unit. The camera 340, for instance, may capture images of the physical environment in the field of view. In some instances, the captured images may be processed, for example, by a virtual reality engine (e.g., the virtual reality engine 116 of FIG. 1) to add virtual objects to the captured images or modify physical objects in the captured images, and the processed images may be displayed to the user by the display 310 for augmented reality (AR) and/or mixed reality (MR) applications.

Figure 4:
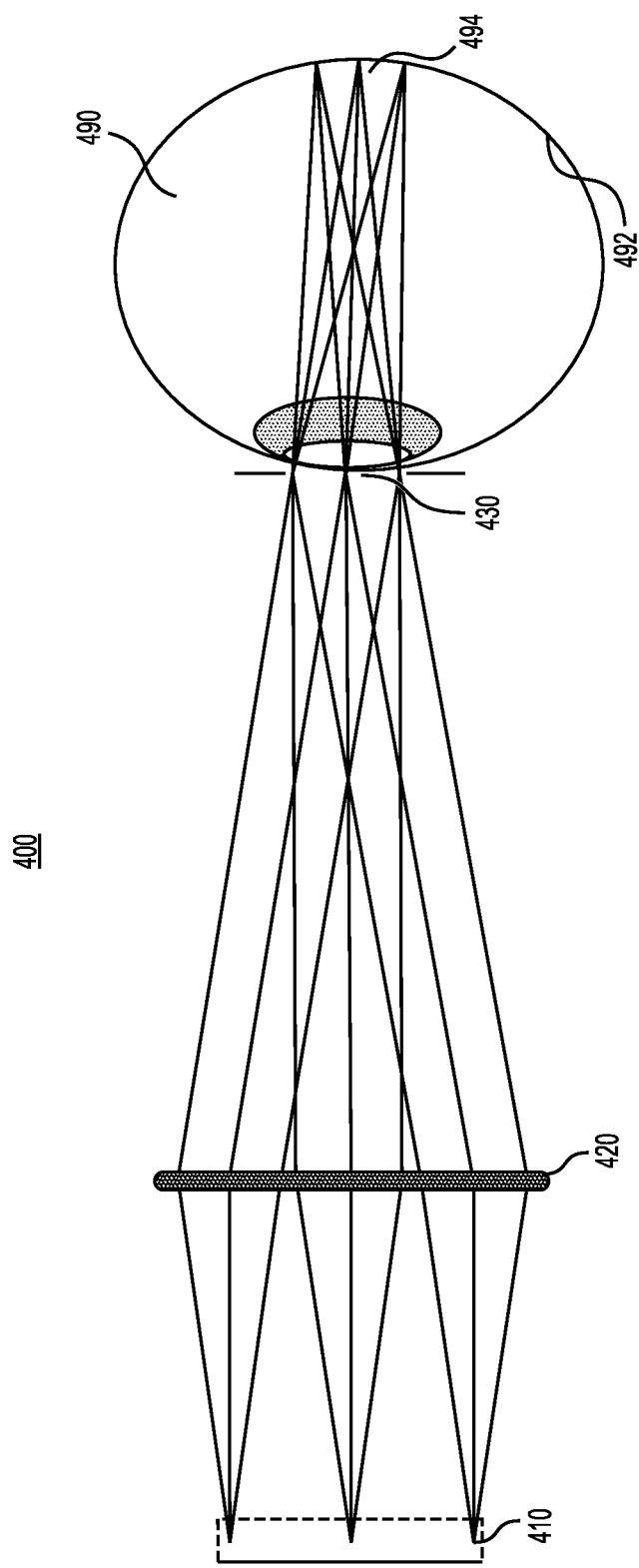
FIG. 4 illustrates a schematic diagram of an optical system in a near-eye display system, according to an example.

FIG. 4 illustrates a schematic diagram of an optical system 400 in a near-eye display system, according to an example. In some examples, the optical system 400 may include an image source 410 and any number of projector optics 420 (which may include waveguides having gratings as discussed herein). In the example shown in FIG. 4, the image source 410 may be positioned in front of the projector optics 420 and may project light toward the projector optics 420. In some examples, the image source 410 may be located outside of the field of view (FOV) of a user's eye 490. In this case, the projector optics 420 may include one or more reflectors, refractors, or directional couplers that may deflect light from the image source 410 that is outside of the field of view (FOV) of the user's eye 490 to make the image source 410 appear to be in front of the user's eye 490. Light from an area (e.g., a pixel or a light emitting device) on the image source 410 may be collimated and directed to an exit pupil 430 by the projector optics 420. Thus, objects at different spatial locations on the image source 410 may appear to be objects far away from the user's eye 490 in different viewing angles (i.e., fields of view (FOV)). The collimated light from different viewing angles may then be focused by the lens of the user's eye 490 onto different locations on retina 492 of the user's eye 490. For example, at least some portions of the light may be focused on a fovea 494 on the retina 492. Collimated light rays from an area on the image source 410 and incident on the user's eye 490 from a same direction may be focused onto a same location on the retina 492. As such, a single image of the image source 410 may be formed on the retina 492.

In some instances, a user experience of using an artificial reality system may depend on several characteristics of the optical system, including field of view (FOV), image quality (e.g., angular resolution), size of the eyebox (to accommodate for eye and head movements), and brightness of the light (or contrast) within the eyebox. Also, in some examples, to create a fully immersive visual environment, a large field of view (FOV) may be desirable because a large field of view (FOV) (e.g., greater than about 60°) may provide a sense of "being in" an image, rather than merely viewing the image. In some instances, smaller fields of view may also preclude some important visual information. For example, a head-mounted display (HMD) system with a small field of view (FOV) may use a gesture interface, but users may not readily see their hands in the small field of view (FOV) to be sure that they are using the correct motions or movements. On the other hand, wider fields of view may require larger displays or optical systems, which may influence the size, weight, cost, and/or comfort of the head-mounted display (HMD) itself.

In some examples, a waveguide may be utilized to couple light into and/or out of a display system. In particular, in some examples and as described further below, light of projected images may be coupled into or out of the waveguide using any number of reflective or diffractive optical elements, such as gratings. For example, as described further below, one or more volume Bragg gratings (VBG) may be utilized in a waveguide-based, back-mounted display system (e.g., a pair of glasses or similar eyewear).

In some examples, one or more volume Bragg gratings (VBGs) (or two portions of a same grating) may be used to diffract display light from a projector to a user's eye. Furthermore, in some examples, the one or more volume Bragg gratings (VBGs) may also help compensate for any dispersion of display light caused by each other to reduce the overall dispersion in a waveguide-based display system.

Figure 5:
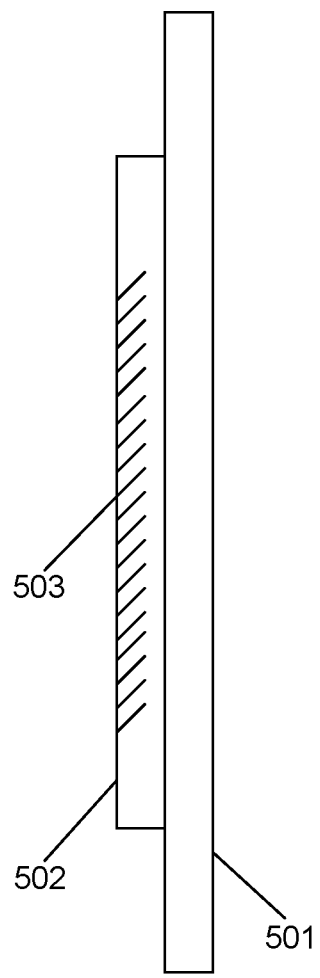
FIG. 5 illustrates a diagram of a waveguide, according to an example.

FIG. 5 illustrates a diagram of a waveguide 500, according to an example. In some examples, the waveguide 500 may include a plurality of layers, such as at least one substrate 501 and at least one photopolymer layer 502. In some examples, the substrate 501 may be a comprised of a polymer or glass material. In some examples, the photopolymer layer 502 may be transparent or "see-through", and may include any number of photosensitive materials (e.g., a photo-thermo-refractive glass) or other similar material.

In some examples, the at least one substrate 501 and the at least one photopolymer layer 502 may be optically bonded (e.g., glued on top of each other) to form the waveguide 500. In some examples, the substrate 501 may have a thickness of anywhere between around 0.1-1.0 millimeters (mm) or other thickness range. In some examples, the photopolymer layer 502 may be a film layer having a thickness of anywhere between about 10-800 micrometers (μm) or other range.

In some examples, one or more volume Bragg gratings (VBGs) may be provided in (or exposed into) the photopolymer layer 502. That is, in some examples, the one or more volume Bragg gratings may be exposed by generating an interference pattern 503 into the photopolymer layer 502. In some examples, the interference pattern 503 may be generated by superimposing two lasers to create a spatial modulation that may generate the interference pattern 503 in and/or throughout the photopolymer layer 502. In some examples, the interference pattern 503 may be a sinusoidal pattern. Also, in some examples, the interference pattern 503 may be made permanent via a chemical, optical, mechanical, or other similar process.

By exposing the interference pattern 503 into the photopolymer layer 502, for example, the refractive index of the photopolymer layer 502 may be altered and a volume Bragg grating may be provided in the photopolymer layer 502. Indeed, in some examples, a plurality of volume Bragg gratings or one or more sets of volume Bragg gratings may be exposed in the photopolymer layer 502. It should be appreciated that this technique may be referred to as "multiplexing." It should also be appreciated that other various techniques to provide a volume Bragg grating (VBG) in or on the photopolymer layer 502 may also be provided.

Figure 6:
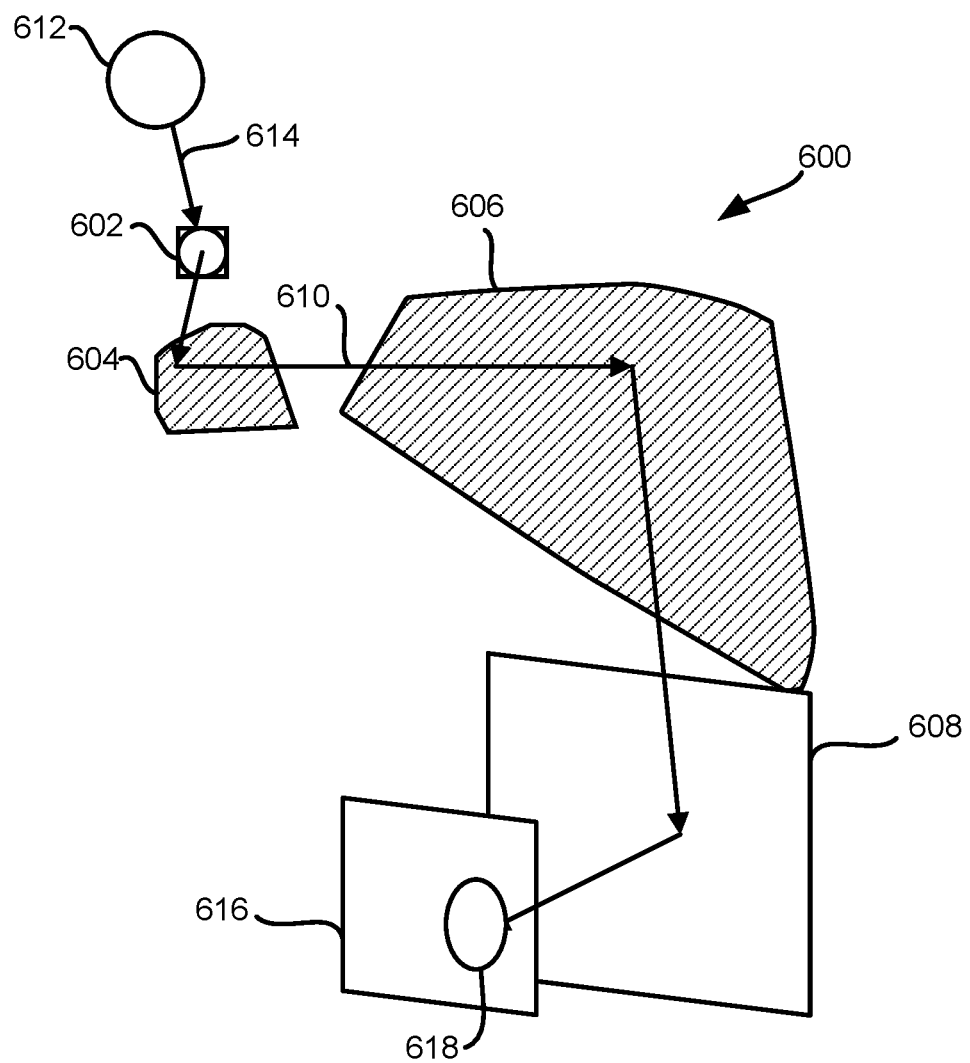
FIG. 6 illustrates a diagram of a waveguide including an arrangement of volume Bragg gratings (VBGs), according to an example.

FIG. 6 illustrates a diagram of a waveguide configuration 600 including an arrangement of volume Bragg gratings (VBGs), according to an example. In some examples, the waveguide configuration 600 may be used in a display system, similar to the near-eye display system 300 of FIG. 3. The waveguide configuration 600, as shown, may include an input volume Bragg grating (VBG) 602 ("input grating" or "IG"), a first middle volume Bragg grating (VBG) 604 ("first middle grating" or "MG1"), a second middle volume Bragg grating (VBG) 606 ("second middle grating" or "MG2"), and an output volume Bragg grating (VBG) 608 ("output grating" or "OG").

In some examples, a projector 612 of the display system may transmit display light 614 to the arrangement of volume Bragg gratings (VBGs) 602-608 in the waveguide configuration 600. As shown, the projector 612 may output the display light 614 to the input grating 602. The input grating 602 may include a grating configuration that may propagate the display light 614 received from the projector 612 to the first middle grating 604. The first middle grating 604 may include a grating configuration that may propagate the received display light 614 to the second middle grating 606. The second middle grating 606 may include a grating configuration that may propagate the display light 614 to the output grating 608. The output grating 608 may include a grating configuration that may propagate the received display light 614 to an eyebox 616 or a user's eye (not shown). The display light 614 may be associated with an image 618 that may be displayed on the eyebox 616 or that a user may otherwise see the image 618.

Each of the input grating 602, the first middle grating 604, the second middle grating 606, and the output grating 608 may include grating configurations to cause received light to be propagated, e.g., refracted, diffracted, and/or reflected, into certain directions as shown by the arrows 610. It should be understood that the arrows 610 depicted in FIG. 6 may represent a plurality of light rays that may, for instance, expand as the light rays are propagated from the input grating 602, the first middle grating 604, the second middle grating 606, and the output grating 608.

As discussed above, the waveguide configuration 600 may include any number of volume Bragg gratings (VBGs) that may be exposed into a "see-through" photopolymer material. In this way, the entire waveguide configuration 600 may be relatively transparent so that a user may see through to the other side of the waveguide configuration 600. At the same time, the waveguide configuration 600, with its arrangement of volume Bragg gratings 602-608, may (among other things) receive the propagated display light 614 from the projector 612 and may cause the propagated display light 614 to be displayed as an image 618 in front of a user's eyes for viewing. For instance, the waveguide configuration 600 may cause an image 618 corresponding to the display light 614 to be displayed on the eyebox 616. In this way, any number of augmented reality (AR) and/or mixed reality (MR) environments may be provided to and experienced by the user.

In some examples, the input grating 602 and the output grating 208 may have the same grating vector with respect to each other. Additionally, the first middle grating 604 and the second middle grating 606 may have the same grating vector with respect to each other. As a result, dispersion of light propagated through the input grating 602, the first middle grating 604, the second middle grating 606, and the output grating 208 may cancel. In order to incorporate an intended range of field of view and spectrum, each of the gratings 602-608 may contain multiplex grating pitches to support the intended range of field of view and spectrum.

Figure 7A:
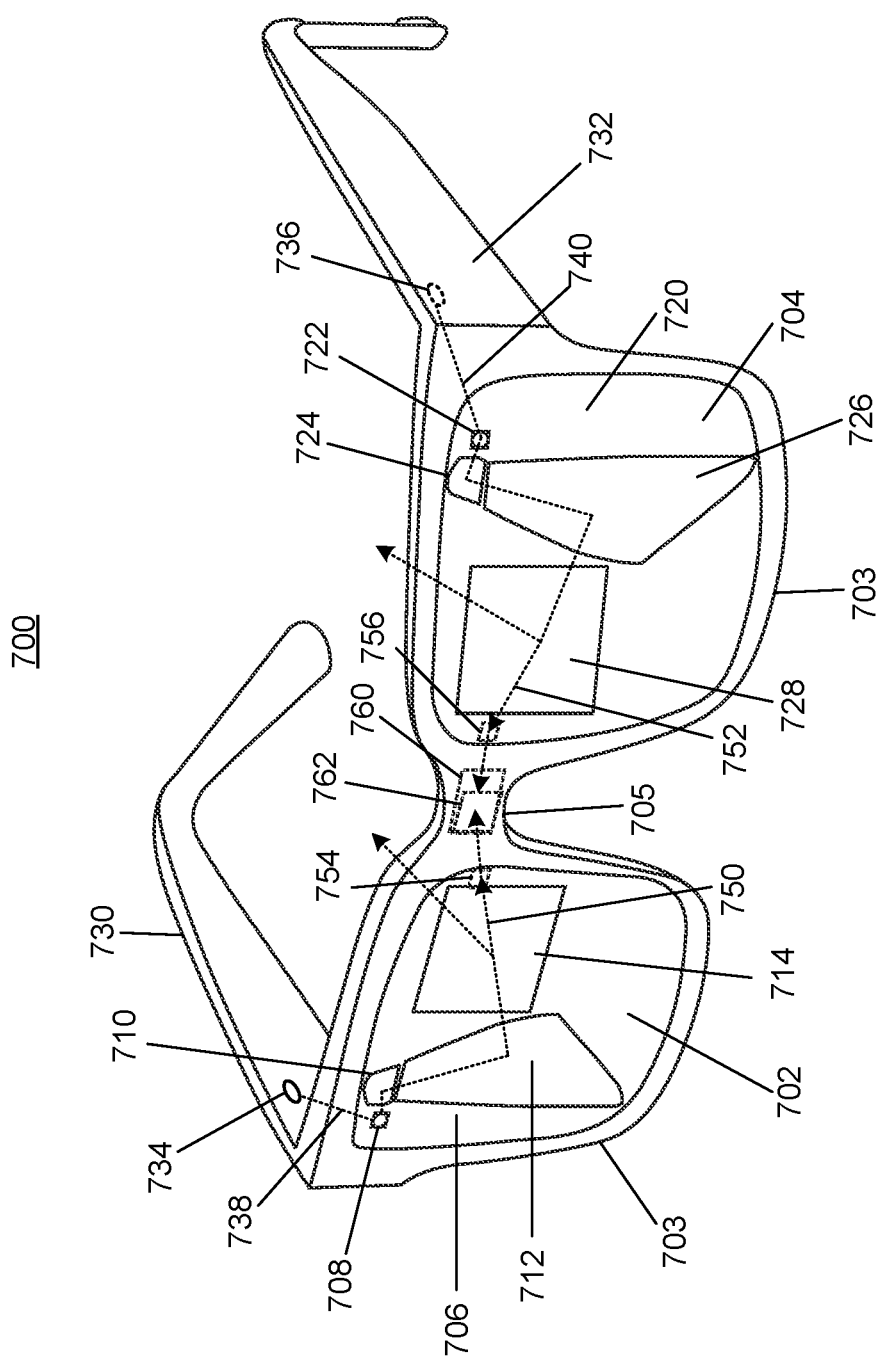
FIGS. 7A and 7B, respectively, illustrate diagrams of a back-mounted arrangement for a display system in a shape of eyeglasses, having a disparity sensing detector, according to an example.
Figure 7B:
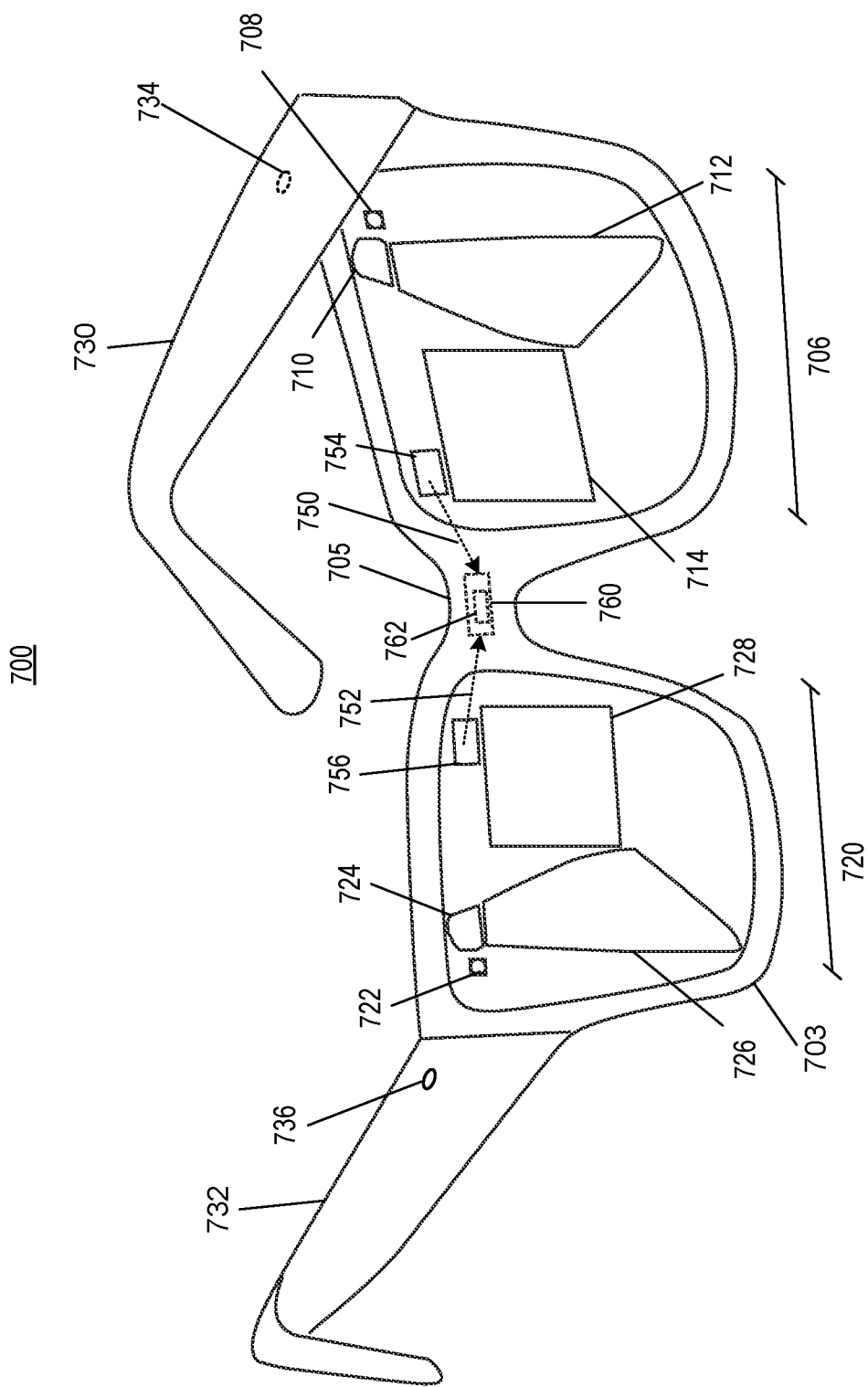

FIGS. 7A and 7B, respectively, illustrate diagrams of a back-mounted arrangement for a display system 700 in a shape of wearable eyewear, e.g., eyeglasses, having a disparity sensing detector, according to an example. In some examples, the display system 700 may include a first lens assembly 702 and a second lens assembly 704 mounted on a frame 703. As shown, a bridge 705 may couple the first lens assembly 702 and the second lens assembly 704. Each of the lens assemblies 702, 704 may include waveguide configurations that are equivalent to the waveguide configuration 600 depicted in FIG. 6. For instance, the first lens assembly 702 may include a waveguide configuration 706 that may include an input grating 708, a first middle grating 710, a second middle grating 712, and an output grating 714. Although not shown, the first lens assembly 702 may include an eyebox 616 positioned behind the output grating 714. For instance, the waveguide configuration 706 may be formed in a first photopolymer layer and the eyebox 616 may be formed in a second photopolymer layer that is adjacent to the first photopolymer layer.

In addition, the second lens assembly 704 may include a waveguide configuration 720 that may include an input grating 722, a first middle grating 724, a second middle grating 726, and an output grating 728. The second lens assembly 704 may also include an eyebox 616 positioned behind the output grating 728. For instance, the waveguide configuration 720 may be formed in a first photopolymer layer and the eyebox 616 may be formed in a second photopolymer layer that is adjacent to the first photopolymer layer.

As shown in FIGS. 7A and 7B, the display system 700 may include a first temple arm 730 that may be positioned next to a user's right temple when the display system 700 is positioned with respect to the user's eyes. The display system 700 may also include a second temple arm 732 that may be positioned next to the user's left temple when the display system 700 is positioned with respect to the user's eyes. The first temple arm 730 and the second temple arm 732 may each be hingedly connected to the frame 703. A first projector 734 may be positioned near or on the first temple arm 730 and a second projector 736 may be positioned near or on the second temple arm 732. For instance, the first projector 734 may be mounted at an interior side of a right temple arm 730 and the second projector 736 may be mounted at an interior side of a left temple arm 732. Each of the first projector 734 and the second projector 736 may be similar to the light source 612 (e.g., projector 612) depicted in FIG. 6. In this regard, the first projector 734 may be positioned and configured to direct display light 738 from the first projector 734 into the input grating 708 such that the display light 738 corresponding to a first image may be propagated through the gratings 708-714 to be displayed on, for instance, an eyebox of the first lens assembly 702. Likewise, the second projector 736 may be positioned and configured to direct display light 740 into the input grating 722 such that the display light 740 corresponding to a second image may be propagated through the gratings 722-728 to be displayed, for instance, on an eyebox of the second lens assembly 704.

In the examples shown in FIGS. 7A and 7B, the first projector 734 and the second projector 736 are "rear-mounted" to be located behind (i.e., closer to the user's eye and away from a displayed image) of the first waveguide configuration 706 and the second waveguide configuration 720 respectively. In other examples, the first projector 734 and the second projector 736 may be "front-mounted" to be located in front (i.e., away from the user's eye and towards a displayed image) of the first waveguide configuration 706 and the second waveguide configuration 720, respectively.

In some examples, the first lens assembly 702 and the second lens assembly 704 may present a first image and a second image, respectively, to be viewed by a user's respective eye, when wearing the display system 700, to generate a simultaneous, "binocular" viewing. That is, in some examples, the first image projected by the first lens assembly 702 and the second image projected on the second lens assembly 704 may be uniformly and symmetrically "merged" to create a binocular visual effect for a user of the display system 700.

As discussed herein, there may be a disparity between a first image viewed through the first lens assembly 702 and a second image viewed through the second lens assembly 704. The disparity may be caused by a misalignment between a projector 734, 736 and a waveguide 706, 720, errors within manufacturing tolerance limits, and/or the like. The disparity may result in unmerged and/or displaced images viewed through the first lens assembly 702 and the second lens assembly 704. When this occurs, a user wearing the display system 700 (e.g., eyewear) may experience, among other things, poor visual acuity and significant visual discomfort, which may result in dizziness, eye fatigue, or other side effects.

It should be appreciated that such disparities may be of any of various types. Examples may include any number of displacements, distortions, or unaligned/unmerged images. In some examples, a disparity, such as a misalignment, may be present between one or more projectors of a display projection assembly and one or more waveguide configurations in the display projection assembly or display system. In these examples, the one or more projectors may be static with respect to each other. In other examples, a misalignment may be present between one or more lenses or display panels of a display projection assembly or display system, in which one or more projectors may be misaligned relative to each other. In further examples, a disparity, e.g., misalignment, may be present as a result of a low-order deformation of a waveguide configuration included in a display projection assembly or display system. Other issues that may arise as a result of misalignment may include orientation issues, such as "tilt" and "tip." These may include, but may not be limited to, any shift, rotation, displacement, distortion, or other perceived disparity characteristics that requires correction for proper viewing by a user. Moreover, it should be appreciated that active detection and correction may, in some cases, be essential to enable a back-mounted arrangement for a display system.

As shown in FIGS. 7A and 7B, a user may view display light 738, 740 that may have propagated through and out of the waveguides 706, 720 of the display system 700. In an example where a waveguide 706, 720 may include a first set of volume Bragg gratings (VBG) and a second set of volume Bragg gratings (VBG), some of the display light that may travel through (i.e., be diffracted by) the first set of volume Bragg gratings (VBG) may not travel through (i.e., be diffracted by) the second set of volume Bragg gratings (VBG). Put another way, some of the display light that may travel through the first set of volume Bragg gratings (VBG) and the second set of volume Bragg gratings (VBG) may be required to meet the Bragg conditions for the first set of volume Bragg gratings (VBG) and the second set of volume Bragg gratings (VBG). There may, however be display light that may not meet the Bragg conditions for one or more of the first set of volume Bragg gratings (VBG) and the second set of volume Bragg gratings (VBG) may remain unused. The display light may be considered as being unused when the display light is not directed for viewing by the user.

Figure 8:
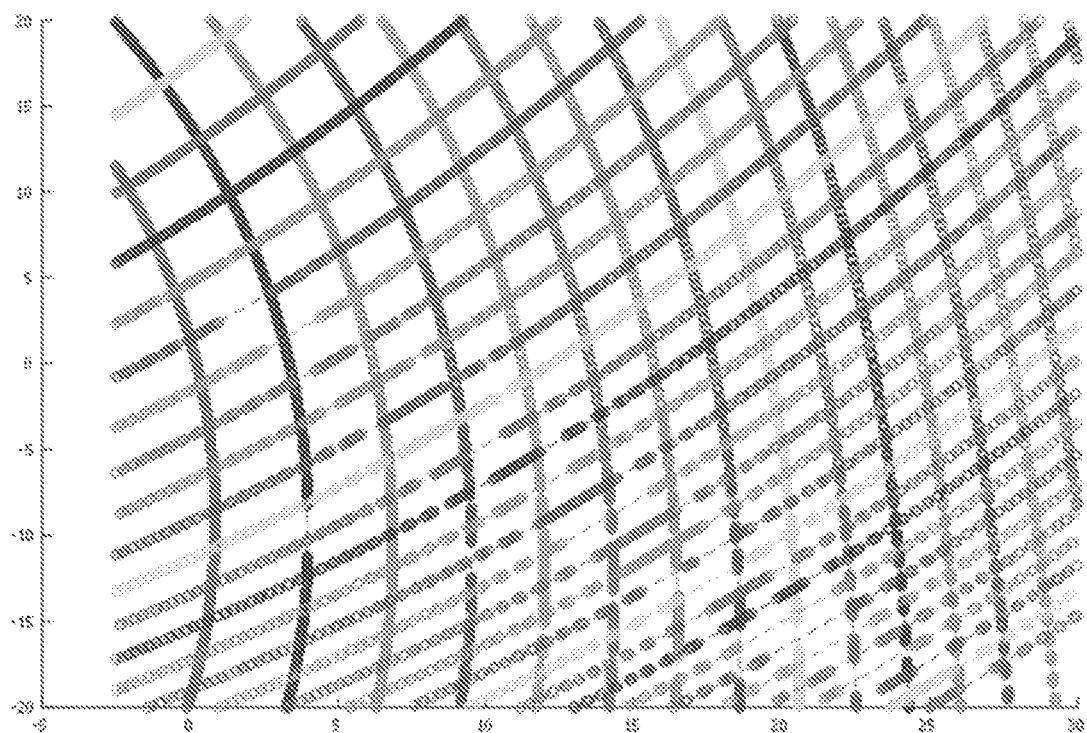
FIG. 8 shows a representation of various diffractions associated with an arrangement of gratings for one fixed wavelength, according to an example.

With reference to FIG. 8, there is shown a representation 800 of various diffractions associated with an arrangement of gratings for one fixed wavelength, according to an example. In this example, the unit associated x-axis and the unit associated with the y-axis may be degrees. In this example, the first vertical lines may correspond to a first arrangement of gratings (e.g., an in-coupling grating) and the horizontal lines may correspond to a second arrangement of gratings (e.g., a middle grating). In this example, the first arrangement of gratings and the second arrangement of gratings may be included in a waveguide, e.g., waveguides 706, 720, and may employ differing gratings structures.

In this example, light that meet a Bragg condition for both the first arrangement of gratings and the second arrangement of gratings may be represented by an intersection of a vertical line and a horizontal line (i.e., both Bragg conditions are met). In some instances, this may represent light that may be "used". Furthermore, in this example, light that may be represented on a line in between two intersections may not travel through and out of the waveguide (i.e., "unused" light). In addition, in this example, light that may be represented as not on a line (i.e., in between vertical lines and horizontal lines) may not travel through and out of the waveguide (i.e., "unused" light) as well. So, in an instance where a projector (e.g., a light-emitting diode (LED) projector) may provide a broadband light source, each wavelength associated with the broadband light source may have used and unused light in a similar manner.

With reference back to FIGS. 7A and 7B, unused light 750 may be directed out of the output grating 714 of the first waveguide 706 in a direction toward the bridge 705. Similarly, unused light 752 may be directed out of the output grating 728 of the second waveguide 720 toward the bridge 705. In addition or alternatively, the unused light 750, 752 may be directed out of other ones of the gratings in the first and second waveguides 706, 720. In some instances, the unused light 750, 752 may be a byproduct of the propagation of the display light through the first and second waveguides 706, 720. In other instances, the first and second waveguides 706, 720 may be fabricated to direct the unused light 750, 752 toward the bridge 705.

In some examples, a significant amount of light projected by a projector 734, 736 in the display system 700 may be unused. In addition, because the unused light 750, 752 may include a same field of view (FOV) information as the used light that a user may view, the unused light 750, 752 may be used for disparity determinations and correction. By utilizing the unused light 750, 752, a need for a dedicated source of display information that may require additional fabrication (i.e., manufacturing steps) may be obviated. Moreover, in some examples, utilization of unused light 750, 752 for disparity analysis and correction may reduce or eliminate interference(s) between display path and disparity sensing paths.

In some examples, first and second disparity sensing ports 754, 756 may be located to receive the unused display light 750, 752 from the respective waveguides 706, 720. In particular, in some examples and as discussed further below, the disparity sensing ports 754, 756 may be located in relation to the waveguides 706, 720 to enable receipt of unused display light 750, 752 propagating to and/or within the waveguides 706, 720.

The first disparity sensing port 754 may be located near a bridge 705 of a frame 703. In some examples, the first disparity sensing port 754 may be configured (e.g., located) to receive unused light 750 that may propagate from the first projector 734. So, in some examples, the first disparity sensing port 754 may receive (unused) light that may propagate through the input volume Bragg grating (VBG) 708, but not through the first middle volume Bragg grating (VBG) 710 and the second middle volume Bragg grating (VBG) 712. In other examples, the first disparity sensing port 754 may receive (unused) light that may propagate through the input volume Bragg grating (VBG) 708 and through the first middle volume Bragg grating (VBG) 710, but not through the second middle volume Bragg grating (VBG) 712.

In some examples, the first disparity sensing port 754 and the second disparity sensing port 756 may be designed as a waveguide configuration that may include one or more volume Bragg gratings (VBGs). Moreover, in some examples, the first disparity sensing port 754 and the second disparity sensing port 756 may be physically and/or functionally coupled in such a manner as to operate as one element.

In some examples, the second disparity sensing port 756 may be located near the bridge 705. In some examples, the second disparity sensing port 756 may be configured (e.g., located) to receive unused light that may propagate from the second projector 736. So, in some examples, the second disparity sensing port 756 may receive (unused) light that may propagate through the input volume Bragg grating (VBG) 722, but not through the first middle volume Bragg grating (VBG) 724 and the second middle volume Bragg grating (VBG) 726. In other examples, the second disparity sensing port 756 may receive (unused) light that may propagate through the input volume Bragg grating (VBG) 722 and through the first middle volume Bragg grating (VBG) 724, but not through the second middle volume Bragg grating (VBG) 726.

In some examples, the first disparity sensing port 754 may receive unused light from the first projector 734 and the second disparity sensing port 756 may receive unused light from the second projector 736, and may direct the unused light from these sources to collection optics 760. The collection optics 760 may direct the unused light to a disparity sensing detector 762 as discussed in greater detail herein. So, in some examples, the first disparity sensing port 754 and the second disparity sensing port 756 may be configured to receive and provide (e.g., "funnel" or "channel") the unused light to the collection optics 760.

In some examples, the first and second disparity sensing ports 754, 756 may pass the unused display light 750, 752 to various elements of the display system 700. For instance, and as discussed in greater detail herein, the disparity sensing ports 754, 756 may pass the unused display light 750, 752 to collection optics 760, which may direct the unused display light 750, 752 to a disparity sensing detector 762. As also discussed herein, the disparity sensing detector 762 may detect the received unused display light 750, 752, in which the display light detected by the disparity sensing detector 762 may be used to determine whether a disparity in the first display light 738 and the second display light 740 exists. If found, a corrective measure may be employed to reduce or remove the disparity. Examples of disparity sensing detectors 762 may include photodetectors, image sensors, and/or the like, that may be utilized to detect various aspects of propagated light.

In some examples, the disparity sensing detector 762 may be located behind either or both of the disparity sensing ports 754, 756. Also, in some examples, each of the disparity sensing ports 754, 756 may be located near a waveguide plate surface. So, in one example, the first disparity sensing port 754 may be located near the eyebox 616 of the first lens assembly 702. In another example, the first disparity sensing port 754 may be located above the output volume Bragg grating (VBG) 714. In particular, in some examples, the first disparity sensing port 754 may be located between 2 millimeters (mm) and 10 millimeters (mm) above the output volume Bragg grating (VBG) 714.

It should be appreciated that a location of the first and second disparity sensing ports 754, 756 may include anywhere that any unused light that may contain a same field of view (FOV) information as light that may be viewed by a user (i.e., used) may be obtained. In some examples, the first and second disparity sensing ports 754, 756 may each be located to ensure receipt of an amount of unused light that may be sufficient for the disparity sensing detector 762 to analyze and/or correct disparities. In one example, the first and second disparity sensing ports 754, 756 may be located to ensure receipt of a maximum amount of unused light. It should be appreciated that, in addition to receipt of an amount of unused light, the locations of the disparity sensing ports 754, 756 may be based on other criteria such as user experience associated with and weight and aesthetic of the display system 700.

According to examples, the first and second disparity sensing ports 754, 756 may each be gratings in respective waveguides 706, 720. For instance, each of the first and second disparity sensing ports 754, 756 may be formed as volume Bragg gratings (VBG) in the waveguides 706, 720 to refract, diffract, reflect, and/or the like, the respectively received unused display light 750, 752 toward the collection optics 760. The disparity sensing ports 754, 756 may thus be patterned into the layers of the first and second lens assemblies 702, 704. In other examples, the disparity sensing ports 754, 756 may be reflectors, mirrors, prisms, gratings, or combination thereof, and/or other similar elements or components. In some examples, each of the first disparity sensing port 754 and the second disparity sensing port 754 may be designed similarly to the input volume Bragg grating (VBG) 708, 722 and/or the output volume Bragg grating (VBG) 714, 728.

Figure 9A:
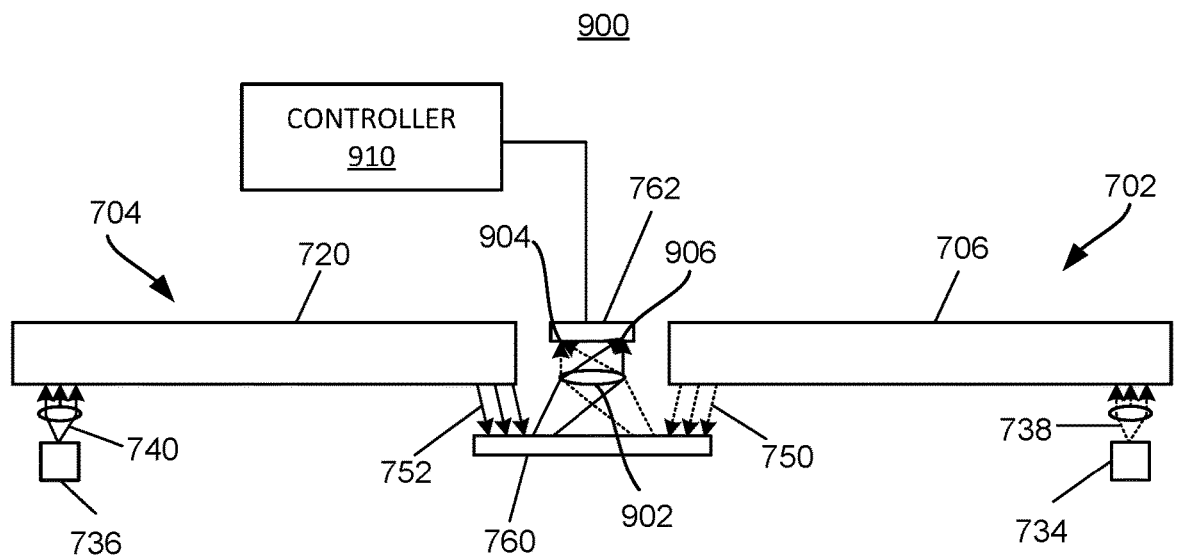
FIGS. 9A and 9B, respectively, depict schematic diagrams of a display system, e.g., an apparatus, a wearable eyewear, etc., according to an example.
Figure 9B:
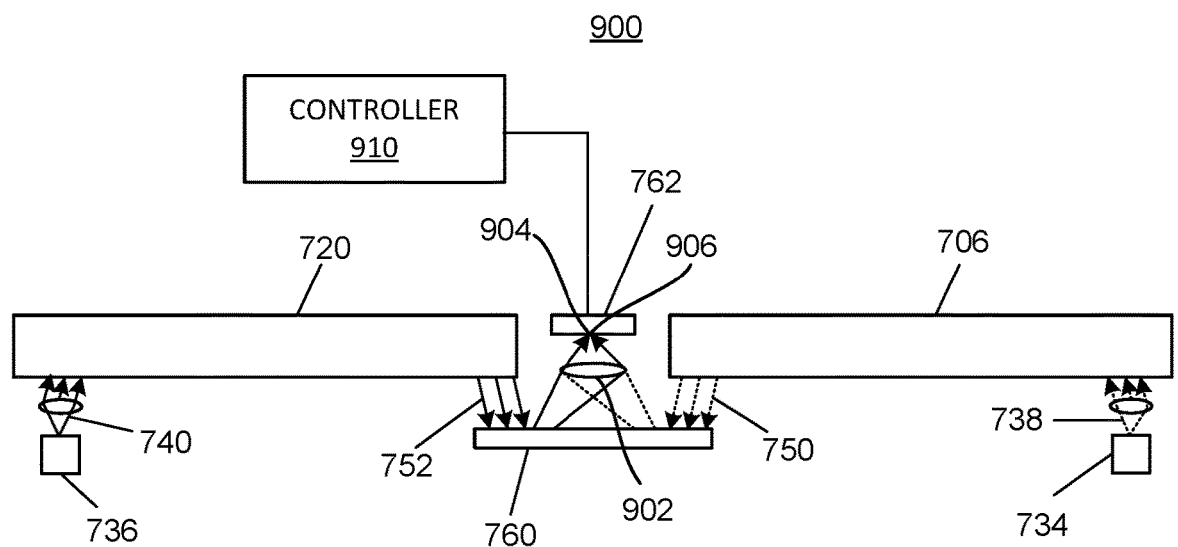

FIGS. 9A and 9B, respectively, depict schematic diagrams of a display system 900, e.g., an apparatus, a wearable eyewear, etc., according to an example. The display system 900 may be equivalent to the display system 700 depicted in FIGS. 7A and 7B and may thus include many of the same components. As such, like reference numerals in FIGS. 9A and 9B are equivalent to the reference numerals in FIGS. 7A and 7B.

As shown in FIG. 9A, the display system 900 may include a first lens assembly 702 and a second lens assembly 704. The first lens assembly 702 is depicted as including a first waveguide 706 and a first projector 734. The second lens assembly 704 is depicted as including a second waveguide 720 and a second projector 736. The first projector 734 may output a first display light 738, for instance, through a lens and into the first waveguide 706. The second projector 736 may output a second display light 740, for instance, through a lens and into the second waveguide 720.

As discussed herein, the first waveguide 706 and the second waveguide 720 may include respective sets of gratings to direct the first display light 738 and the second display light 740 to be viewed by a user. As also discussed herein, some of the first display light 738, e.g., unused first display light 750, and some of the second display light 740, e.g., unused second display light 752 may be directed to collection optics 760. In addition, the collection optics 760 may direct the received light to a disparity sensing detector 762. In some examples, the collection optics 760 may include a light directing device and a lens 902, in which the lens 902 may focus the light from the light directing device to the disparity sensing detector 762. The lens 902 may be Fresnel lens, a diffractive flat lens (e.g., a volume Bragg grating, a surface relief grating, a polarization volume hologram, and/or the like.), etc.

In some examples, the first display light 738 and the second display light 740 may each include an image of a dot or other element. In any of these examples, the disparity sensing detector 762 may determine the locations on the disparity sensing detector 762 at which the dot or other element included in the first display light 738 and the second display light 740 are detected. As shown in FIG. 9A, the disparity sensing detector 762 may determine that a first element in the first display light 738 is detected at a first location 904. The disparity sensing detector 762 may determine that a second element in the second display light 740 is detected at a second location 906.

In some examples, the disparity sensing detector 762 may communicate the detected locations 904, 906 to a controller 910. The controller 910 may determine whether there is a sufficient disparity between the images contained in the first display light 738 and the second display light 740 based on the locations 904, 906 detected by the disparity sensing detector 762. For instance, the controller 910 may determine whether the disparity exceeds a predefined disparity level and may determine that there is a sufficient disparity based on the disparity exceeding the predefined disparity level. The predefined disparity level may be user defined, based on testing, based on modeling, and/or the like.

In addition, in some examples, the controller 910 may determine how the disparity is to be corrected, e.g., whether the display light output by either or both of the first projector 734 and the second projector 736 are to be adjusted. The controller 910 may determine the direction and/or magnitude of the correction(s), e.g., shifting of the images. The controller 910 may be a semiconductor-based microprocessor, a central processing unit (CPU), an application specific integrated circuit (ASIC), a field-programmable gate array (FPGA), and/or other suitable hardware device. In some examples, the controller 910 is integrated in the display system 900, while in other examples, the controller 910 is separate from the display system 900. For instance, the controller 910 may be part of the console 110 depicted in FIG. 1.

Turning now to FIG. 9B, there is shown an example in which the output of the display lights 738, 740 have been shifted. For instance, the controller 910 may cause the images included in either or both of the display lights 738, 740 to be shifted by one or more pixels to cause locations 904, 906 at which the disparity sensing detector 762 detects the elements in the display lights 738, 740 to be within the predefined disparity level, e.g., within a known offset. Additionally or alternative, disparity may be corrected by physically re-orienting or mechanically realigning projector 734, 736 and/or display lights 738,740 until alignment of images 904, 906 is achieved. Through implementation of the correction, the images in the first and second display lights 738, 740 may be better aligned with respect to each other, which may reduce problems associated with misaligned images.

FIGS. 10A-10F, respectively, show partial schematic diagrams of display systems 1000, e.g., an apparatus, a wearable eyewear, etc., according to examples. The display systems 1000 may be equivalent to the display system 900 and particularly, depict, various types of collection optics 760, e.g., light directing devices and lenses, that may be employed in the display system 900 to direct the first and second display lights 738, 740 to the disparity sensing detector 762.

Figure 10A:
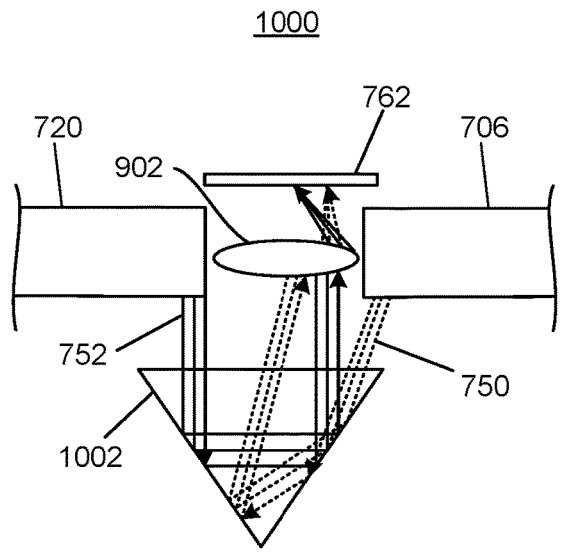
FIGS. 10A-10F, respectively, show partial schematic diagrams of display systems, e.g., an apparatus, a wearable eyewear, etc., according to examples.

In the example shown in FIG. 10A, the light directing device in the collection optics 760 may be a prism 1002. The prism 1002 may be configured and arranged to direct the first and second display lights 738, 740 (or the unused lights 750, 752) to the lens 902. The lens 902 may focus the first and second display lights 738, 740 (or the unused lights 750, 752) onto the disparity sensing detector 762. The first display light 738 (750) has been depicted with dotted lines to distinguish them from the second display light 740 (752). In some examples, the walls of the prism 1002 may be flat, while in other examples, the walls of the prism 1002 may be curved to focus the display lights 738, 740 (or the unused lights 750, 752) toward the lens 902.

Figure 10B:
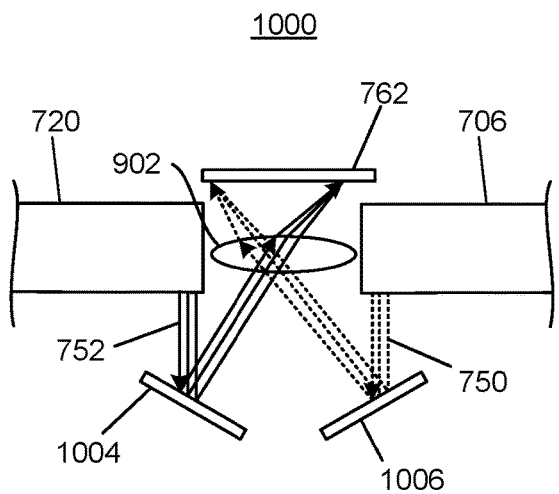

In the example shown in FIG. 10B, the light directing device in the collection optics 760 may be reflectors 1004, 1006. The reflectors 1004, 1006 may be configured and arranged to reflect the first and second display lights 738, 740 (or the unused lights 750, 752) to the lens 902. The lens 902 may focus the first and second display lights 738, 740 (or the unused lights 750, 752) onto the disparity sensing detector 762. The first display light 738 (750) has been depicted with dotted lines to distinguish them from the second display light 740 (752). In some examples, the walls of the reflectors 1004, 1006 may be flat, while in other examples, the walls of the reflectors 1004, 1006 may be curved to focus the display lights 738, 740 (or the unused lights 750, 752) toward the lens 902.

Figure 10C:
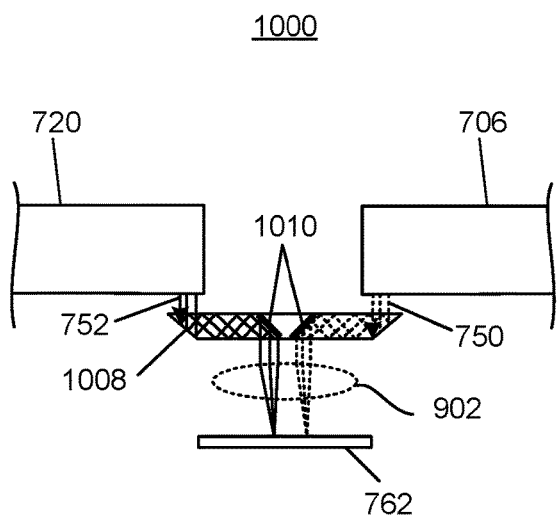

In the example shown in FIG. 10C, the light directing device in the collection optics 760 may be a prism 1008 that includes reflectors 1010. The prism 1008 may direct the display lights 738, 740 (or the unused lights 750, 752) toward the reflectors 1010. In addition, the reflectors 1010 may be configured and arranged to reflect the first and second display lights 738, 740 (or the unused lights 750, 752) to the lens 902. The lens 902 may focus the first and second display lights 738, 740 (or the unused lights 750, 752) onto the disparity sensing detector 762. In the arrangement shown in FIG. 10C, the lens 902 and the disparity sensing detector 762 may be positioned on the opposite side of the light directing device 1008 with reflectors 1010 flipped about an horizontal axis so to redirect the light as compared to the arrangements shown in FIGS. 10A and 10B. In some examples, the walls of the prism 1008 and/or the reflectors 1010 may be flat, while in other examples, the walls of the prism 1008 and/or the reflectors 1010 may be curved to focus the display lights 738, 740 (or the unused lights 750, 752) toward the lens 902.

Figure 10D:
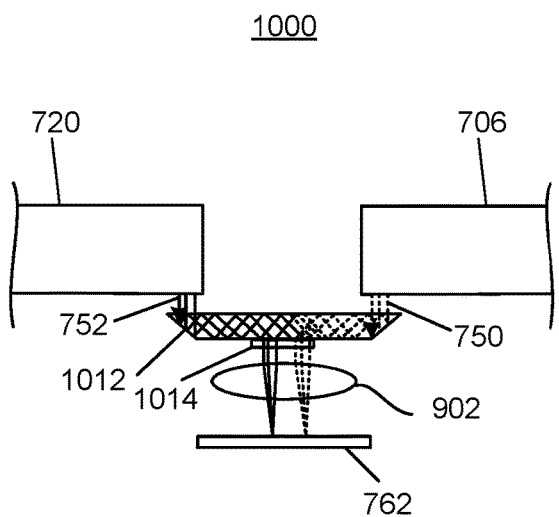

In the example shown in FIG. 10D, the light directing device in the collection optics 760 may be a prism 1012 that includes an output grating 1014. The prism 1012 may direct the display lights 738, 740 (or the unused lights 750, 752) toward the output grating 1014. In addition, the output grating 1014 may be configured and arranged to direct the first and second display lights 738, 740 (or the unused lights 750, 752) to the lens 902. The lens 902 may focus the first and second display lights 738, 740 (or the unused lights 750, 752) onto the disparity sensing detector 762. In some examples, the output grating 1014 may have spatially varying pitches that may provide power to the delivery of the display lights 738, 740 (or the unused lights 750, 752). In the arrangement as shown in FIG. 10D, the lens 902 and the disparity sensing detector 762 may be positioned on the opposite side of the prism 1012, as compared to the arrangements shown in FIGS. 10A and 10B. In some examples, the output grating 1014 may be placed at the opposite side of the prism 1012 and/or designed to have higher efficiencies, for instance, to diffract light toward the lens 902 and/or detector 762, which may be placed on either side relative to prism 1012.

Figure 10E:
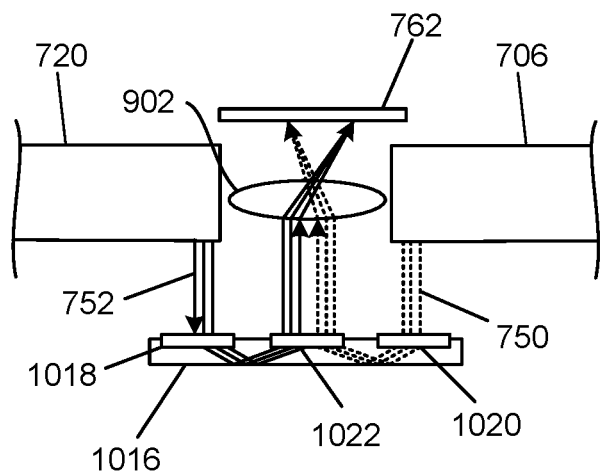

In the example shown in FIG. 10E, the light directing device in the collection optics 760 may be a waveguide 1016 that includes input gratings 1018, 1020 and an output grating 1022. As shown, the display lights 738, 740 (or the unused lights 750, 752) may be directed into the input gratings 1018, 1020 and the waveguide 1016 may propagate the display lights 738, 740 (or the unused lights 750, 752) to the output grating 1022. In addition, the output grating 1022 may be configured and arranged to direct the first and second display lights 738, 740 (or the unused lights 750, 752) to the lens 902. The lens 902 may focus the first and second display lights 738, 740 (or the unused lights 750, 752) onto the disparity sensing detector 762. In some examples, the input gratings 1018, 1020 and/or the output grating 1022 may have spatially varying pitches that may provide power to the delivery of the display lights 738, 740 (or the unused lights 750, 752).

Figure 10F:
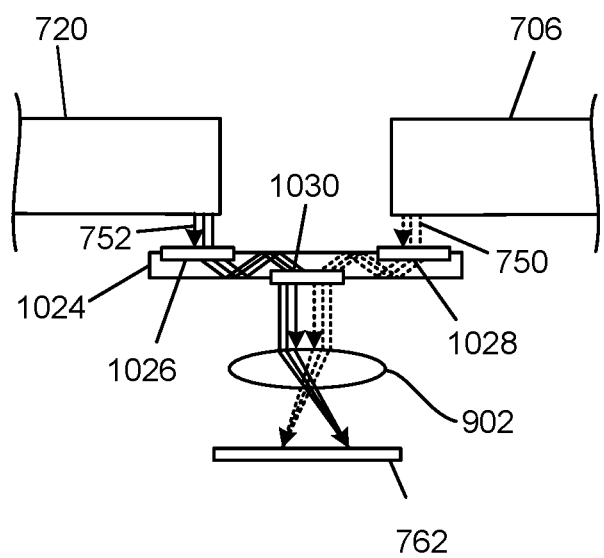

In the example shown in FIG. 10F, the light directing device in the collection optics 760 may be a waveguide 1024 that includes input gratings 1026, 1028 and an output grating 1030. As shown, the display lights 738, 740 ((or the unused lights 750, 752) may be directed into the input gratings 1026, 1028 and the waveguide 1024 may propagate the display lights 738, 740 (or the unused lights 750, 752) to the output grating 1030. In addition, the output grating 1030 may be configured and arranged to direct the first and second display lights 738, 740 (or the unused lights 750, 752) to the lens 902. The lens 902 may focus the first and second display lights 738, 740 (or the unused lights 750, 752) onto the disparity sensing detector 762. In some examples, the input gratings 1026, 1028 and/or the output grating 1030 may have spatially varying pitches that may provide power to the delivery of the display lights 738, 740 (or the unused lights 750, 752). It should be appreciated that in FIGS. 10E-10F, for example, the input and output gratings may be placed on either side of the waveguide. Furthermore, any number of AR coatings may be added to increase or improve coupling efficiency in any desired direction.

In the foregoing description, various inventive examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. A display system, comprising:
  a disparity sensing detector;
  collection optics;
  a first lens assembly comprising:
    a first projector to output a first display light associated with a first image; and
    a first waveguide, comprising an input grating, a first middle grating, a second middle grating, and an output grating, for propagating the first display light through the input grating, the first and second middle gratings, then through the output grating, and to the collection optics, wherein the collection optics is to direct the first display light to the disparity sensing detector, and wherein the input and output gratings of the first waveguide have a same grating vector to cause any dispersion of light propagated through the input and output gratings of the first waveguide to cancel; and
  a second lens assembly comprising:
    a second projector to output a second display light associated with a second image; and
    a second waveguide, comprising an input grating, a first middle grating, a second middle grating, and an output grating, for propagating the second display light through the input grating, the first and second middle gratings, then through the output grating, and to the collection optics, wherein the collection optics is to direct the second display light to the disparity sensing detector, and wherein the input and output gratings of the second waveguide have a same grating vector to cause any dispersion of light propagated through the input and output gratings of the second waveguide to cancel.

2. The display system of claim 1, further comprising:
  a frame to be worn as eyewear by a user, wherein the disparity sensing detector and the collection optics are located near a center of the frame.

3. The display system of claim 2, wherein the first lens assembly is located on a first side of the frame and the second lens assembly is located on a second side of the frame.

4. The display system of claim 2, wherein the frame further comprises:
  a first temple arm, wherein the first projector is located near or on the first temple arm; and
  a second temple arm, wherein the second projector is located near or on the second temple arm.

5. The display system of claim 1, wherein the collection optics comprise a light directing device to direct the first display light and the second display light to the disparity sensing detector.

6. The display system of claim 1, further comprising:
  a first display to display the first display light corresponding to the first image; and
  a second display to display the second display light corresponding to the second image,
  wherein the disparity sensing detector is to detect locations at which the first image and the second image are respectively displayed on the first display and the second display, determine whether a disparity exists between the detected locations, and cause the disparity to be compensated.

7. The display system of claim 6, wherein, to cause the disparity to be compensated, the disparity sensing detector is to cause the first projector to shift the first display light or the second projector to shift the second display light.

8. The display system of claim 5, wherein the light directing device comprises a lens, a prism, or a reflector to direct the first display light and the second display light to the disparity sensing detector.

9. The display system of claim 5, wherein the light directing device comprises a thin waveguide to direct the first display light and the second display light to the disparity sensing detector.

10. An apparatus comprising:
  a disparity sensing detector;
  a light directing device;
  a first waveguide, comprising an input grating, a first middle grating, a second middle grating, and an output grating, to propagate a first display light through the input grating, the first and second middle gratings, then through the output grating, and to the light directing device, wherein the light directing device is to direct the first display light to the disparity sensing detector, and wherein the input and output gratings of the first waveguide have a same grating vector to cause any dispersion of light propagated through the input and output gratings of the first waveguide to cancel; and
  a second waveguide, comprising an input grating, a first middle grating, a second middle grating, and an output grating, to propagate a second display light through the input grating, the first and second middle gratings, then through the output grating, and to the light directing device, wherein the light directing device is to direct the second display light to the disparity sensing detector, and wherein the input and output gratings of the second waveguide have a same grating vector to cause any dispersion of light propagated through the input and output gratings of the second waveguide to cancel.

11. The apparatus of claim 10, further comprising:
  a frame to be worn as eyewear by a user of the apparatus, the frame including:

a first section supporting a first lens assembly, wherein the first waveguide is formed in the first lens assembly;

a second section supporting a second lens assembly, wherein the second waveguide is formed in the second lens assembly; and a bridge connecting the first section and the second section, the bridge supporting the disparity sensing detector.

12. The apparatus of claim 11, further comprising:

a first projector to output the first display light to the first waveguide;

a second projector to output the second display light to the second waveguide;

a first temple arm hingedly connected to the frame, wherein the first projector is located near or on the first temple arm; and a second temple arm hingedly connected to the frame, wherein the second projector is located near or on the second temple arm.

13. The apparatus of claim 10, further comprising:

a lens to focus light directed from light directing device to the disparity sensing detector.

14. The apparatus of claim 10, wherein the light directing device comprises a prism.

15. The apparatus of claim 10, further comprising:

a first display to display the first display light corresponding to a first image; and a second display to display the second display light corresponding to a second image, wherein the disparity sensing detector is to detect locations at which the first image and the second image are respectively displayed on the first display and the second display, determine whether a disparity exists between the detected locations, and cause the disparity to be compensated.

16. A wearable eyewear comprising:

a disparity sensing detector;

collection optics;

a first section supporting a first lens assembly, the first lens assembly having a first waveguide, comprising an input grating, a first middle grating, a second middle grating, and an output grating, to propagate a first display light through the input grating, the first and second middle gratings, then through the output grating, and to the collection optics and for viewing by a user of the eyewear, wherein the input and output gratings of the first waveguide have a same grating vector to cause any dispersion of light propagated through the input and output gratings of the first waveguide to cancel;

a second section supporting a second lens assembly, the second lens assembly having a second waveguide, comprising an input grating, a first middle grating, a second middle grating, and an output grating, to propagate a second display light through the input grating, the first and second middle gratings, then through the output grating, and to the collection optics and for viewing by the user, wherein the input and output gratings of the second waveguide have a same grating vector to cause any dispersion of light propagated through the input and output gratings of the second waveguide to cancel; and a bridge connecting the first section and the second section, the bridge supporting the disparity sensing detector and the collection optics, wherein the disparity sensing detector is to receive the first display light and the second display light from the collection optics.

17. The wearable eyewear of claim 16, further comprising:

a frame including the first section, the second section, and the bridge;

a first projector to output the first display light to the first waveguide;

a second projector to output the second display light to the second waveguide;

a first temple arm hingedly connected to a first side of the frame, wherein the first projector is located near or on the first temple arm; and a second temple arm hingedly connected to a second side of the frame, wherein the second projector is located near or on the second temple arm.

18. The wearable eyewear of claim 16, wherein the collection optics comprise:

a lens; and a light directing device to direct the first display light and the second display light to the lens, wherein the lens is to focus the first display light and the second display light directed from the light directing device to the disparity sensing detector.

19. The wearable eyewear of claim 16, further comprising:

a first display to display the first display light corresponding to a first image; and a second display to display the second display light corresponding to a second image, wherein the disparity sensing detector is to detect locations at which the first image and the second image are respectively displayed on the first display and the second display, determine whether a disparity exists between the detected locations, and cause the disparity to be compensated.

20. The wearable eyewear of claim 18, wherein the light directing device comprises a prism or a reflector.

* * * * *